United States Patent
Ajima et al.

(10) Patent No.: US 7,271,557 B2
(45) Date of Patent: Sep. 18, 2007

(54) AC MOTOR DRIVING APPARATUS AND METHOD OF CONTROLLING THE SAME

(75) Inventors: Toshiyuki Ajima, Hitachi (JP); Hideki Miyazaki, Hitachi (JP); Yoshitaka Iwaji, Hitachinaka (JP); Takao Yanai, Hitachi (JP); Kinya Nakatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/486,151

(22) Filed: Jul. 14, 2006

(65) Prior Publication Data

US 2007/0013333 A1 Jan. 18, 2007

(30) Foreign Application Priority Data

Jul. 15, 2005 (JP) ............................. 2005-207199

(51) Int. Cl.
*H02P 7/00* (2006.01)
(52) U.S. Cl. ................ 318/432; 318/254; 318/434; 318/439; 318/629
(58) Field of Classification Search ........ 318/430–439, 318/254, 245, 139
See application file for complete search history.

(56) References Cited

U.S. PATENT DOCUMENTS

| | | | | |
|---|---|---|---|---|
| 5,278,485 A * | 1/1994 | Kim | ............ | 318/802 |
| 5,334,923 A * | 8/1994 | Lorenz et al. | ............ | 318/805 |
| 6,222,335 B1 * | 4/2001 | Hiti et al. | ............ | 318/432 |
| 6,690,137 B2 | 2/2004 | Iwaji et al. | | |
| 7,042,181 B2 * | 5/2006 | Nagakura | ............ | 318/434 |
| 7,161,323 B2 * | 1/2007 | Ajima et al. | ............ | 318/629 |
| 2001/0043048 A1 * | 11/2001 | Tajima et al. | ............ | 318/727 |
| 2003/0020430 A1 * | 1/2003 | Hiraga et al. | ............ | 318/729 |
| 2004/0189243 A1 * | 9/2004 | Tobari et al. | ............ | 318/807 |
| 2005/0077853 A1 * | 4/2005 | Nagakura | ............ | 318/432 |
| 2006/0001392 A1 * | 1/2006 | Ajima et al. | ............ | 318/432 |
| 2006/0006825 A1 * | 1/2006 | Inaguma et al. | ............ | 318/432 |
| 2006/0119309 A1 * | 6/2006 | Kim | ............ | 318/800 |
| 2007/0001635 A1 * | 1/2007 | Ho | ............ | 318/254 |

FOREIGN PATENT DOCUMENTS

| | | |
|---|---|---|
| EP | 709 277 A1 | 5/1996 |
| EP | 943 527 A2 | 9/1999 |
| EP | 1 072 498 A2 | 1/2001 |
| GB | 2 367 543 A | 4/2002 |
| JP | 6-153526 A | 5/1994 |
| JP | 2004-274841 A | 9/2004 |
| JP | 2004-282969 A | 10/2004 |
| JP | 2004-297966 A | 10/2004 |

\* cited by examiner

*Primary Examiner*—Paul Ip
(74) *Attorney, Agent, or Firm*—Crowell & Moring LLP

(57) ABSTRACT

The AC motor driving apparatus comprises an inverter for supplying power to an AC motor, current sensors for detecting current that flows in the motor or inverter, a rotation sensor for detecting the rotation of the rotor in the motor, and a control unit for controlling the driving of the inverter. A current detection value detected by the current sensor and a rotor rotational position are used to estimate three-phase motor current values. The estimated motor current values are used to control the inverter. Thereby, an inexpensive, space-saving AC motor driving apparatus as well as an AC motor controller, electric actuator, or vehicle that can perform highly precise torque control from zero speed to high-speed rotation without depending on the PWM pulse pattern are provided.

20 Claims, 9 Drawing Sheets

CROSS-SECTIONAL VIEW IN THE AXIAL DIRECTION

CROSS-SECTIONAL VIEW ALONG A LINE A-A'

MOTOR PHASE CURRENTS AND DC CURRENT

CURRENT PATH AT THE TIMING T

VOLTAGE APPLIED TO THE MOTOR

COUNTER ELECTROMOTIVE FORCES OF THE MOTOR

MOTOR CURRENT

AC MOTOR DRIVING APPARATUS AND METHOD OF CONTROLLING THE SAME

CLAIM OF PRIORITY

The present application claims priority from Japanese application serial no. 2005-207199, filed on Jul. 15, 2005, the content of which is hereby incorporated by reference into this application.

FIELD OF THE INVENTION

The present invention relates to an AC motor driving apparatus and, more particularly, to improvement of an AC motor driving apparatus that is suitable for applications in which acceleration and deceleration are performed between zero speed and high speed rotation.

BACKGROUND OF THE INVENTION

In conventional methods extensively used for AC motor driving apparatus, motor current is detected so that motor toque is controlled with high precision. For cost reduction and other purposes, however, it is desirable to reduce the number of sensors that detect motor current. There are some known examples of methods of reducing the number of sensors.

In Japanese patent laid-open No. Hei 6 (1994)-153526, a current sensor is provided on a DC line of a pulse width modulation (PWM) inverter. Three-phase currents output from the inverter are estimated from the switching pattern of the inverter and a detected DC current value.

In Japanese patent laid-open No. 2004-297966, a current sensor is provided on a DC line of a PWM inverter and a position detector is also provided that detects the rotor phase of an AC motor. The rotor phase is used to convert a detected DC current value into rotational coordinates.

In Japanese patent laid-open No. 2004-274841, a current sensor is provided on a particular phase of an AC motor. The rotor phase of the AC motor is detected from the pulsation of a detected current value so as to drive the motor.

The rotor position detector of an AC motor used for driving purposes, which is applied to a vehicle or the like, requires highly precise torque control, starting from the state at which the motor is stopping. Therefore, a current sensor is used to detect the motor current of each phase. It is known that a so-called one-pulse mode is used, in which PWM is overmodulation and a rectangular voltage for one pulse is applied in each half a cycle so that high-speed rotation of an AC motor is performed more efficiently and the voltage of an inverter power supply is used more efficiently.

SUMMARY OF THE INVENTION

To reduce the cost of an AC motor driving apparatus and save the space required for it, however, there are problems such as reduction in the number of current sensors used. In Patent Document 1, motor current is estimated from the value of current detected on a DC line and a switching pattern of the inverter, so current needs to be detected at least twice at high speed during a PWM carrier cycle. When the motor is running at low speed, however, the PWM pulse width is small and thereby it is difficult to detect current twice in a carrier cycle. When the motor is running at high speed, current is difficult to detect in the one-pulse mode described above, making motor driving difficult.

In Patent Document 2, a quick response is made possible by converting DC current values into rotational coordinates, but the basic concept of current detection can be thought to substantially the same as in Patent Document 1. Accordingly, highly precise torque control is difficult during low-speed and high-speed rotation of the AC motor.

In Patent Document 3, three-phase motor currents are not estimated from current of a particular motor phase, making torque control difficult.

An object of the present invention is to provide an AC motor driving apparatus that uses a small number of current sensors, thereby making the apparatus inexpensive and allowing it to use less space.

Another object of the present invention is to provide an AC motor driving apparatus that achieves highly precise torque control, without depending on the PWM pulse pattern, even for an AC motor that is accelerated and decelerated abruptly between zero speed and high-speed rotation, as well as a vehicle on which the AC motor driving apparatus is mounted and a method of controlling the apparatus.

[Means for Solving the Problems]

According to one aspect of the present invention, an AC motor driving apparatus, which has an AC motor, an inverter for supplying power to the motor, a current sensor for detecting current that flows in the motor or inverter, a rotation sensor for detecting the rotation of the rotor in the motor, and a control unit for controlling the driving of the inverter, detects the rotational position of the rotor from an output signal sent from the rotation sensor, estimates the values of the three-phase motor currents that flow in the AC motor from the current detection value detected by the current sensor and the rotational position of the rotor, and then uses the estimated three-phase motor current values to control the inverter.

In a preferred embodiment of the present invention, the current sensor is disposed at a position at which DC current that flows through a DC line of the inverter or phase current that flows through a particular phase of the AC motor is detected.

In another preferred embodiment of the present invention, in addition to the current sensor described above, at least one second sensor is provided on a DC line of the inverter or a particular phase of the AC motor. If any one of the current sensors causes an error, the remaining normal current sensors are used to continue the driving of the motor.

In another preferred embodiment of the present invention, an AC motor driving apparatus used as a driving apparatus of a vehicle driving AC motor is provided that receives a torque command from a vehicle controller as an input command given to a control unit and controls the motor for its running from zero speed to high speed.

According to a preferred embodiment of the present invention, a small number of sensors are used to estimate motor current from zero speed to high-speed rotation without depending on a PWM pulse pattern. Accordingly, a space-saving, inexpensive AC motor driving apparatus can be provided.

Other objects and features of the present invention will be clarified in embodiments that follow.

DESCRIPTION OF THE PREFERRED EMBODIMENTS

Embodiments of the present invention will be described below with reference to the drawings. First, an AC motor driving apparatus according to an embodiment of the present invention will be described with reference to FIGS. 1 to 4, which is applied to a vehicle driving motor.

Figure 1:
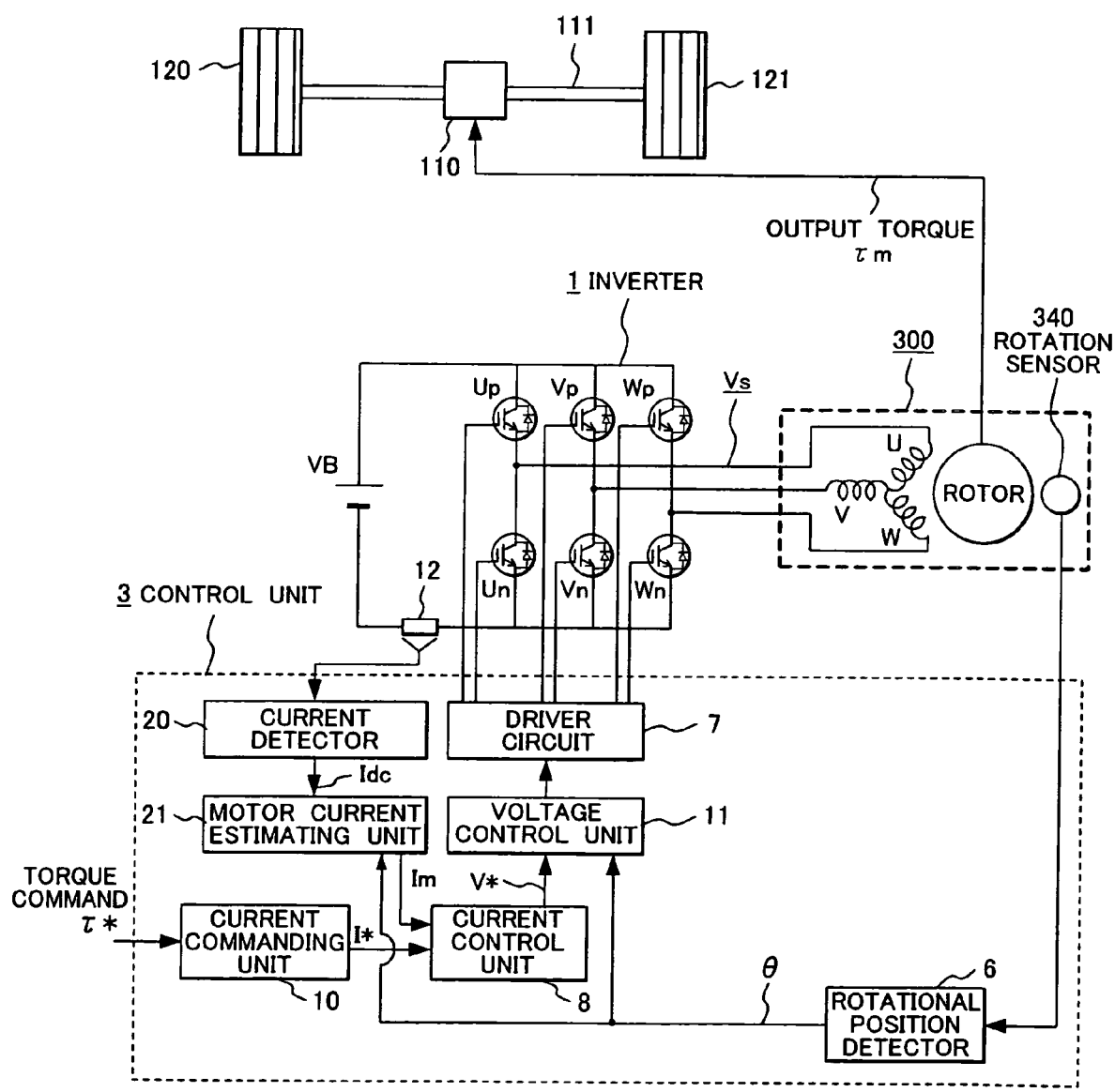
FIG. 1 is a control block diagram of an AC motor driving apparatus according to an embodiment of the present invention.

FIG. 1 is a control block diagram of an AC motor driving apparatus according to this embodiment of the present invention.

A battery VB is a DC voltage source for an inverter 1. The inverter 1 comprises six switching devices (Up, Vp, Wp, Un, Vn, and Wn) in the three phases; it is connected to the motor windings (U, V, and W) of an AC motor 300. DC voltage is converted by the inverter 1 into three-phase AC currents, the voltage and frequency of which are variable, and then applied to the AC motor 300. A current sensor 12 for detecting DC current is provided on a DC line between the battery VB and inverter 1. A shunt resistor, Hall current transformer (CT), or other device may be used as the current sensor 12.

A gate signal for turning on and off one of the switching devices of the inverter 1 is generated by a control unit 3. The control unit 3 receives a torque signal τ* from a vehicle controller (not shown), a detected DC current value Idc, and a signal from a rotor rotation sensor 340 and controls AC voltage to be applied to the motor windings U, V, and W of the AC motor 300. Output torque τm of the motor 300 is transmitted to a gearbox 110 through the output axis of the rotor, and then transmitted to a driving shaft 111 through a gear in the gearbox 110. The output transmitted to the driving shaft 111 drives driving wheels 120 and 121 of a vehicle to run or stop the vehicle (not shown).

The control unit 3 comprises a current detector 20, motor current estimating device 21, current commanding device 10, rotational position detector 6, current control unit 8, voltage control unit 11, and driver circuit 7. The current detector 20 performs signal processing on a signal sent from the current sensor 12 and converts the signal from analog to digital to obtain a DC voltage value Idc. The motor current estimating unit 21 calculates estimated three-phase motor current values Im (Iu, Iv, and Iw) from the DC current value Idc and the magnetic pole position (rotor phase) θ of the rotor. The current commanding unit 10 converts the torque command τ* into a current command value I*. The current control unit 8 outputs a voltage command V* through, for example, proportional integration control so that the estimated motor current value Im matches the current command value I*. The voltage control unit 11 generates a PWM pulse by which the output voltage of the inverter 1 becomes the voltage command V*, and then outputs the pulse to the inverter 1 through the driver circuit 7.

When a vector is controlled, the current command value I* takes either of two values, that is, d-axis current command value Id* and q-axis current command value Iq* in the rotation coordinate system. When conversion is performed, a rotor rotational speed ω (not shown) obtained from the rotor phase θ may be used. The estimated motor current value Im also takes either of two values for the d axis and q axis. The voltage control unit 11 uses the rotor phase θ to convert the voltage values for the d and q axes in the rotation coordinate system into values in three phases, that is, U, V, and W.

Figure 2A:
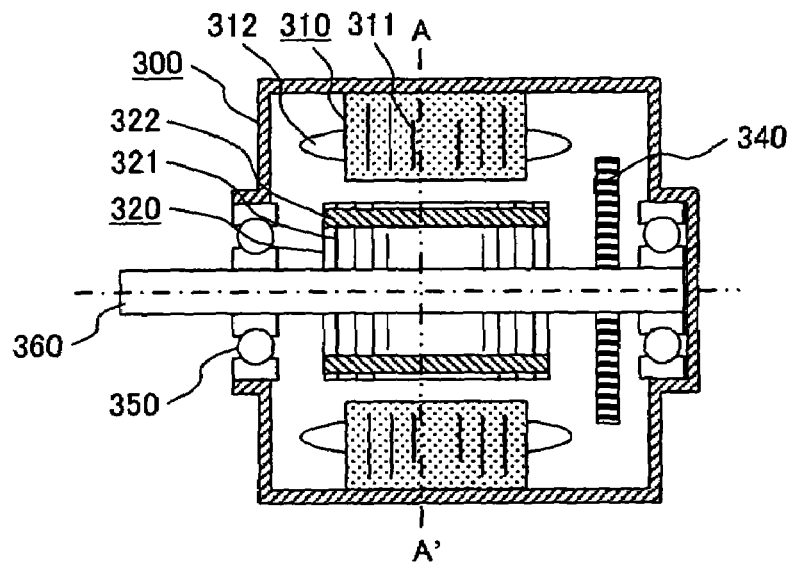
FIG. 2A is cross-sectional view in the axial direction of a vehicle driving motor according to the embodiment of the present invention.
Figure 2B:
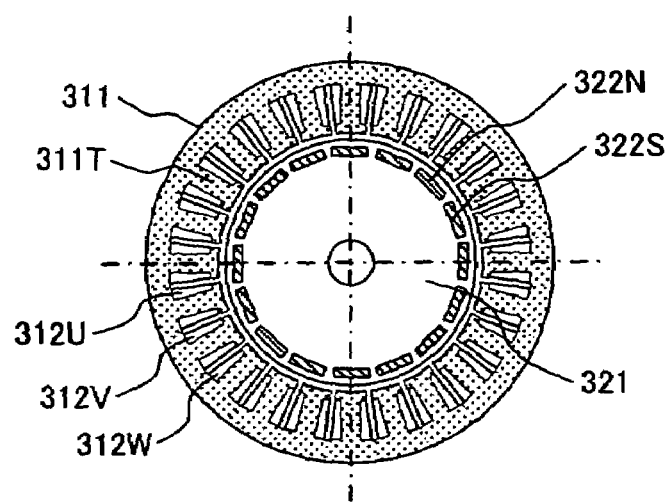
FIG. 2B is cross-sectional view along a line A-A' in the FIG. 2A.

FIG. 2A and FIG. 2B show the structure of a vehicle driving AC motor according to this embodiment of the present invention. FIG. 2A is a cross-sectional view of the motor 300 in the direction of the motor axis. FIG. 2B is a cross-sectional view of the motor along a line A-A' in the radial direction. The motor in this embodiment is a permanent magnet synchronous motor, which uses a permanent magnet's magnetic field. Particularly, the motor is an embedded magnet type of permanent magnet synchronous motor with permanent magnets embedded in the rotor core. The motor is also an adduction motor, in which a rotor 320 is disposed inside the stator core 311 of the stator 310 through a gap, and is a concentrated winding motor, in which windings 312 are wound around a single teeth 311T of the stator core. The rotor 320 comprises a rotor iron 321, permanent magnets 322, and a motor axis 360. The rotor 320 is connected to a rotor rotation sensor 340 through the motor axis 360. The rotation of the rotor axis 360 is supported by a bearing 350. The rotor rotation sensor 340 is preferably an absolute position sensor such as a resolver. However, a sensor using a Hall element may be used without problems. The stator side of the rotor rotation sensor 340 is fixed to the motor housing with screws or other fasteners (not shown). The stator 310 is fixed to the motor housing by being press-fitted or fitted into a key groove. The windings 312 of the stator 310, which are windings 312U, 312V, and 312W in three phases U, V, and W, are disposed sequentially. The permanent magnets 322 of the rotor 320 are disposed toward the gap surface in such a way that a permanent magnet 322N having an N pole and a permanent magnet 322S having an S pole are arranged alternately. The permanent magnet 322 is preferably a rare earth magnet made of, for example, Nd—Fe—B. However, other rare earth magnets or ferrite magnets are not problematic; only the motor output characteristics change.

The motor shown in this embodiment uses 16 poles and 24 slots; that is, the motor arrangement is an integer multiple of 2 (number of poles) to 3 (number of slots). However, other arrangements such as 4 to 3, 8 to 9, and 10 to 12 may be used without problems. In this embodiment, an embedded magnet type of concentrated winding motor has been described, but a surface magnet type or distributed winding type of motor may be used without problems. In addition, other AC motors such as an induction motor can also be applied in a similar way.

Next, the motor current estimating unit 21, that is a main element of this embodiment, will be described in detail.

Figure 3A:
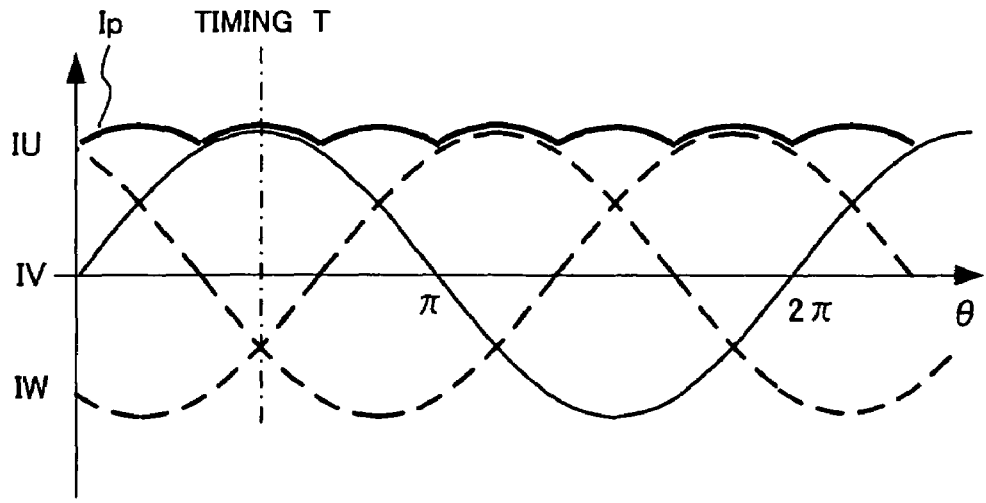
FIG. 3A illustrate a driving current waveform according to the embodiment of the present invention.
Figure 3B:
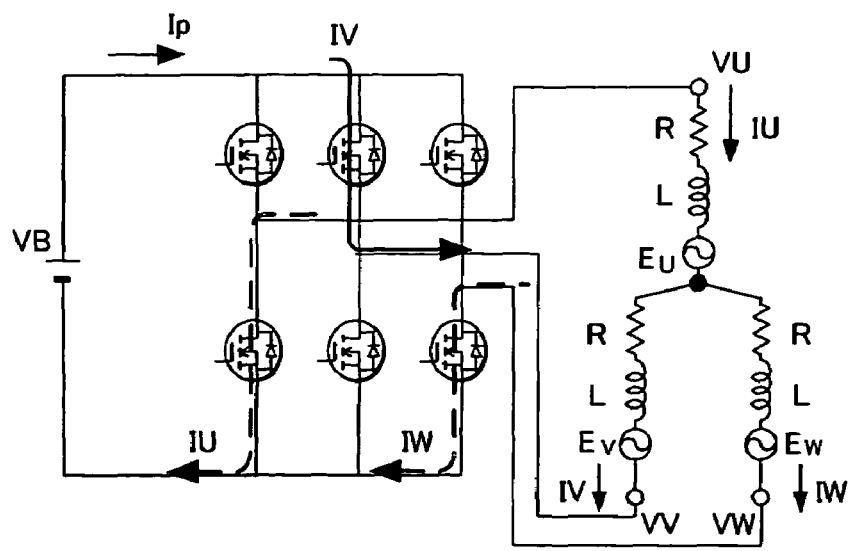
FIG. 3B illustrate a driving current path at the timing T according to the embodiment of the present invention.

FIG. 3A and FIG. 3B illustrate a driving current waveform of the AC motor driving apparatus according to this embodiment of the present invention and its current paths. FIG. 3A shows motor phase currents Iu, Iv, and Iw in the phases as well as DC current flowing in the DC lines; the power factor is 1 ($\phi$=0). FIG. 3B shows the current paths at the timing T. For convenience, pulse-like current due to PWM is represented a continuous waveform. In the motor equivalent circuit, the winding resistance is R, inductance is L, and counter electromotive forces in the phases are Eu, Ev, and Ew. Equations (1) to (3) below represent voltage Vv applied to the V phase and motor phase current Iv flowing in the V phase. The peak value of the applied voltage is V, the peak value of the phase current is I, the voltage phase of the V phase is $\theta v$, and the phase difference between the voltage Vv and current Iv is $\phi$.

$$Vv = V \cdot \sin \theta v \tag{1}$$

$$Iv = I \cdot \sin(\theta v + \phi) \tag{2}$$

$$\theta v = \theta - 120 \tag{3}$$

Some methods of estimating motor phase current from the DC current value Idc by using the rotor phase $\theta$ can be considered. In this embodiment, three methods will be described.

The DC current value Idc is an instantaneous value of the DC current Ip detected by at least one sampling in the carrier cycle; it is a value of current that flows in a current path that comprises the battery VB, inverter, and motor windings. Current that flows in a path that comprises only the inverter and motor windings is backflow current, so it is not detected as the DC current Ip. Since one of the switching elements in the inverter is turned on and sampling is performed at the timing at which the DC current Ip can be detected, motor phase current equal to the DC current can be determined from the applied voltage pattern. At the timing T in FIG. 3(A), the DC current Ip is the phase current Iv in the V phase.

Then, $$Idc = Iv = -(Iu + Iw)$$

In a first method, the DC current value detected from the applied voltage and rotor phase is distributed to the motor currents in the phases. When the applied voltages in the phases are Vu, Vv, and Vw and the rotational speed of the motor is $\omega$, equations (4) to (6) hold.

$$Vu = (R + \omega L) \times Iu + Eu \tag{4}$$

$$Vv = (R + \omega L) \times Iv + Ev \tag{5}$$

$$Vw = (R + \omega L) \times Iw + Ew \tag{6}$$

From the above equations, equation (7) holds.

$$Iv = -\{(Vu - Eu) + (Vw - Ew)\}/(R + \omega L) \tag{7}$$

The counter electromotive forces Eu, Ev, and Ew in the phases can be represented by function $E \cdot f(\theta)$ of the rotor phase $\theta$. If waveform shape function $f(\theta)$ can be approximated to a sine wave, then the counter electromotive forces can be represented by equations (8) to (10).

$$Eu = E \sin(\theta) \tag{8}$$

$$Ev = E \sin(\theta - 120) \tag{9}$$

$$Ew = E \sin(\theta + 120) \tag{10}$$

The ratio of current Iu to current Iw is represented by equation (11). Then, when the rotor phase $\theta$ is applied, the counter electromotive forces Eu and Ew in the pertinent phases can be determined.

$$Iu:Iw = (Vu - Eu):(Vw - Ew) \tag{11}$$

Applied voltage Vu and Vw in the pertinent phases can be replaced with a voltage command V*. The detected DC current value Idc (=Iv) can therefore be distributed to Iu and Iw. In effect, the motor current Im can be estimated by using the applied voltage and counter electromotive force.

Furthermore, applied voltages Vu, Vv, and Vw can be approximated by equations (12) to (14), depending on the WL conditions, as indicated by equation (15). In effect, Iu and Iw can be obtained by using the rotor phase $\theta$.

$$Vu = V \sin(\theta) \tag{12}$$

$$Vv = V \sin(\theta - 120) \tag{13}$$

$$Vw = V \sin(\theta + 120) \tag{14}$$

$$Iu:Iw = \sin(\theta):\sin(\theta + 120) \tag{15}$$

A case in which the DC current Ip becomes the phase current Iv in the V phase has been described. When Iu or Iw is detected, however, the DC current can be obtained in the same way.

Next, a second method will be described in which reactive current Ii is obtained by using the detected DC current value Idc, active current Ir, and rotor phase $\theta$; the active current is a current value obtained by applying averaging processing to the DC current value Idc.

$$Iv = Ir \cdot \sin \theta v + Ii \cdot \cos \theta v \tag{16}$$

$$Ir = I \cdot \cos \phi \tag{17}$$

$$Ii = I \cdot \sin \phi \tag{18}$$

$$\phi = \tan^{-1}(Ii/Ir) \tag{19}$$

Equations (16) to (19) are variations of equations (1) to (3); a power factor angle $\phi$ is obtained from active current Ir and reactive current Ii. Since active current Ir is an average of the detected DC current values Idc, integration (filtering) such as moving averaging can be performed through digital processing by using the DC current value Idc. Since the DC current value Idc is the phase current Iv of the motor and the rotor phase $\theta$ is a detection value, the reactive current Ii can be obtained. In other words, the power factor angle $\phi$ and the peak value I of the phase current can be calculated and thereby the motor current Im of each phase can be estimated.

In the above description, the active current Ir is obtained by digital filtering processing, but an average current value may be detected at the same time through an analog filter circuit in the current detector 20, without problems. When analog processing is performed for signals, the CPU load can be reduced.

A third method will be described last in which the detected DC current value Idc and the current peak I of the DC current value Idc are detected.

It is also possible to detect the peak current I of the detected DC current Idc as a digital value. However, a peak value cannot be necessarily captured at some sampling timing. In addition to the DC current value Idc, therefore, the peak value I of the phase current is preferably detected by using an analog peak hold circuit or sample hold circuit in the current detector 20. Specifically, when the power factor angle φ is obtained by applying the rotor phase θ to equations (1) to (3), the motor current Im in each phase can be estimated.

Figure 4:
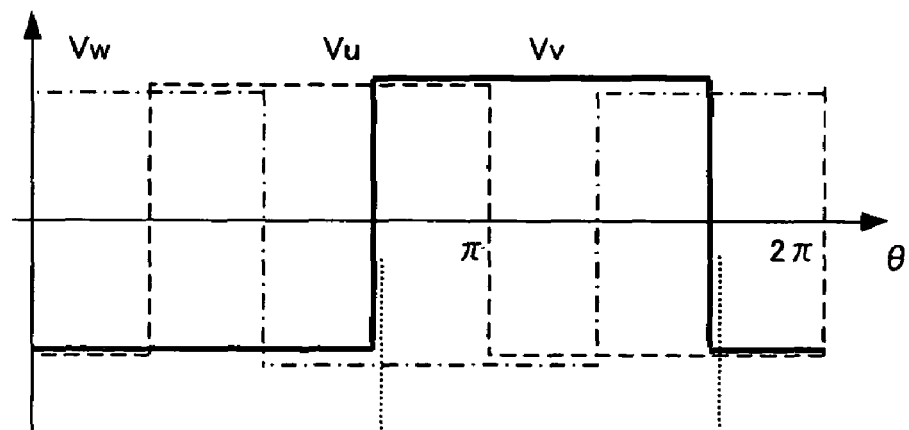
FIG. 4 shows voltage waveforms and a current waveform in the one-pulse mode according to the embodiment of the present invention.
Figure 4:
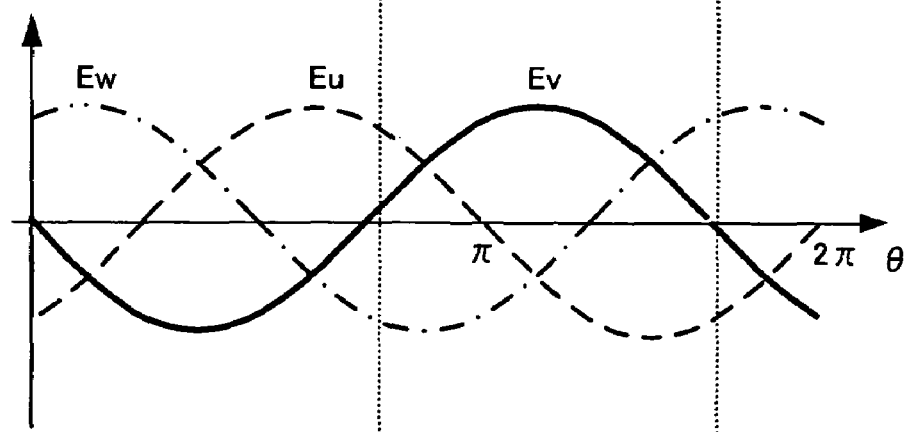
Figure 4:
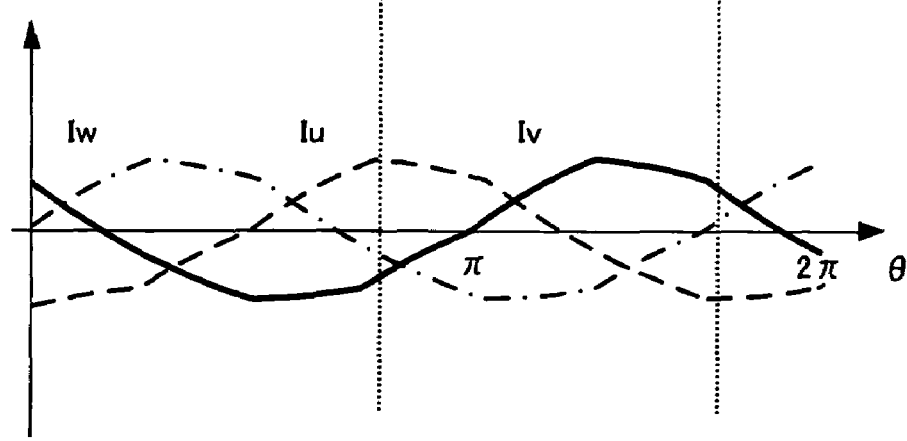

FIG. 4 shows voltage waveforms and a current waveform in the one-pulse mode according to this embodiment of the present invention. The top of FIG. 4 shows an applied voltage, the middle of FIG. 4 shows a counter electromotive forces of the motor, and the bottom of FIG. 4 shows a motor current waveform. The following description focuses on the V phase.

In driving methods widely applied to vehicle driving AC motors, the one-pulse mode is used to increase the voltage usage ratio during high-speed rotation and to reduce a switching loss; in the one-pulse mode, a rectangular voltage for one pulse is applied to the motor in half a cycle. Although a motor current waveform changes from a sine waveform into a distorted waveform, the distortion ratio is relatively small because the motor runs at high speed. Torque pulsation does not cause a serious problem in practice because its frequency is high.

In the drawings, since the waveform is a rectangular waveform for one pulse, there is no PWM-modulated voltage pulse within a segment of an electrical angle of 180° (π[rad]). Accordingly, the method disclosed in Patent Document 1, in which motor current is estimated by a combination of a PWM switching pattern and at least two current samplings in a PWM carrier cycle, cannot be applied.

Specifically, there are six switching patterns in one cycle of electrical angle (2π [rad]), but the PWM switching pattern is left unchanged within a time equivalent to one PWM carrier cycle. Assuming that the PWM carrier frequency is 10 kHz (the PWM carrier frequency is 100 μs), the electrical angle frequency is 800 Hz (one cycle of electrical angle is 1250 μs) when the 16-pole AC motor in FIG. 2 is running at 6000 r/minute. The switching pattern is therefore left unchanged during about two PWM carrier cycles. Although current can be sampled twice in the PWM carrier frequency, the method disclosed in Patent Document 1 can be used to detect a DC current value only for motor current in a particular phase; motor current values in the three phases are difficult to estimate.

In the current detecting method according to this embodiment, current sampling is performed once in the PWM carrier frequency, and motor current is estimated from a DC current value detected in the sampling by using the motor phase θ. Accordingly, motor current can be estimated even in the one-pulse mode.

When the motor is driven at a low rotational speed (this situation is not shown), the motor is driven by applying a PWM-modulated voltage. In this case, the counter electromotive force of the motor is small because of the low-speed rotation, resulting in a small PWM pulse width. This causes current pulses with a small width to flow in the DC line. In this situation as well, it is difficult to capture current by the conventional technique in which current sampling must be performed twice in the PWM carrier cycle. This requires, for example, that the PWM carrier cycle be at a low frequency. Consequently, noise generated in the audible range makes the user uncomfortable. In addition, processing by software becomes complex.

In the current detecting method according to this embodiment, current sampling is performed once in the PWM carrier frequency, and motor current is estimated from a DC current value detected in the sampling by using the motor phase θ. Accordingly, stable current detection is possible.

As described above, the motor driving apparatus according to the present invention uses the current sensor 12 on the DC line and the motor phase θ to estimate motor current, so current detection is possible from zero speed to high-speed rotation without depending on the PWM pulse width. Accordingly, an inexpensive AC motor driving apparatus can be provided, which is still highly responsive and control precision is maintained.

Figure 5:
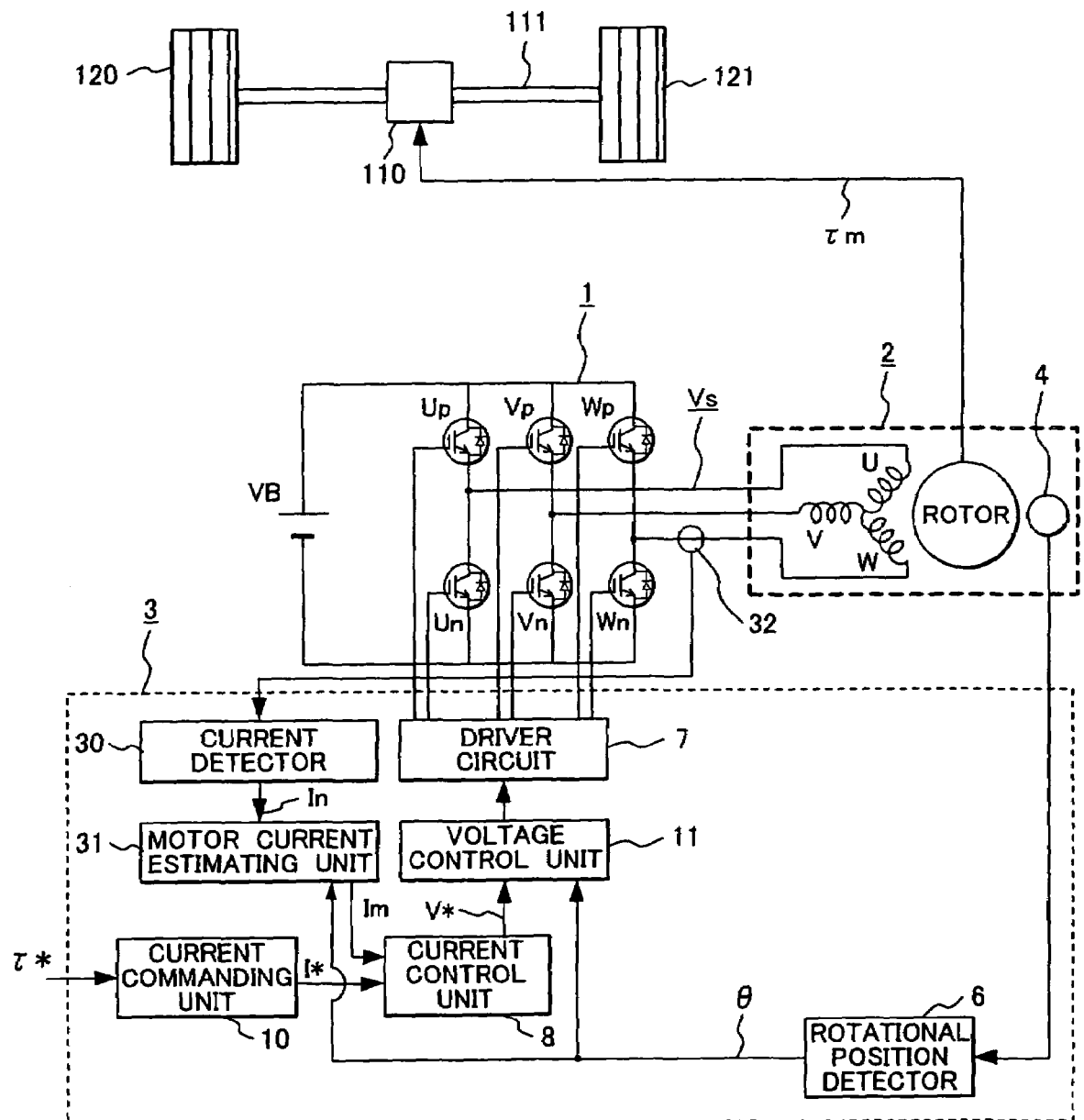
FIG. 5 is a control block diagram of an AC motor driving apparatus according to another embodiment of the present invention.

Next, an AC motor driving apparatus according to another embodiment of the present invention will be described with reference to FIG. 5. FIG. 5 differs from FIG. 1 in that a current detector for detecting phase current in a particular phase of the motor and a motor current estimating unit are provided. The other parts operate in the same way as those having the same reference numerals.

An output signal from a current sensor 32 for detecting phase current in a particular phase of the motor is processed by an A/D converter (not shown) in a current detector 30 so that the level of the signal is detectable. The signal is then converted by the A/D converter into a digital value. The resulting digital signal is supplied to a motor current estimating unit 31 as a current detection value In, and output as a motor current estimated value Im of the three phases of the motor by using the rotor phase θ.

The motor current estimating unit 31 detects a current peak value I in the current detection value In and obtains a power factor angle φ from equations (1) to (3). The current peak value I, power factor angle φ, and rotor phase θ are used to estimate the motor current value Im in the three phases. There is no problem even if the motor current value in the particular phase in which a current sensor is provided does not need to be calculated. When a stable result is desired by, for example, removing noise, however, the result of recalculation can be used.

In this embodiment, digital processing was performed to obtain the current peak value I. However, the peak value I of the phase current can preferably be detected with an analog peak hold circuit or sample hold circuit in the current detector 30 because the detected current peak value I is more accurate when the motor is running at high speed.

Next, an AC motor driving apparatus according to another embodiment of the present invention that has a plurality of current sensors will be described with reference to FIGS. 6 to 8.

Figure 6:
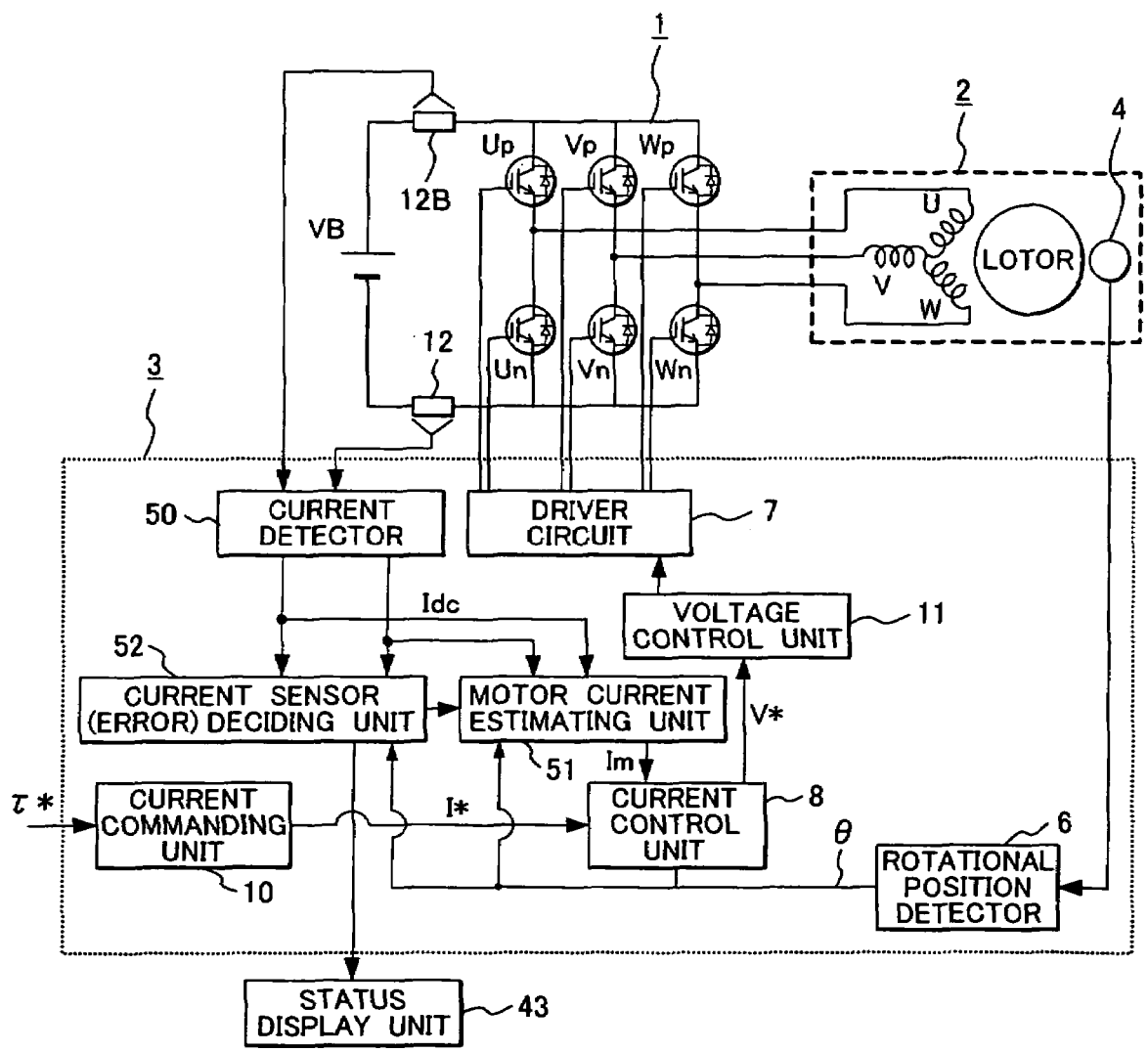
FIG. 6 is a block diagram of an AC motor driving apparatus in which a plurality of current sensors are provided on DC lines according to another embodiment of the present invention.

FIG. 6 is a control block diagram of an AC motor driving apparatus according to this embodiment of the present invention that has a plurality of current sensors on DC lines. The structure in FIG. 6 is similar to the structure in FIG. 1 except that a current sensor is added to the DC line connected to the positive side of the battery. The AC motor driving apparatus includes a current sensor 12B added to a DC line connected to the positive side of the battery, a current detector 50, a motor current estimating unit 51, a current sensor (error) deciding unit 52, and a status display unit 43 for indicating an abnormal state of the current sensor.

At least two current sensors 12 and 12B provided on DC lines connected to the positive and negative sides of the battery assure redundancy of current sensors and enable a ground fault of the motor wiring (motor windings) to be detected. Another difference from FIG. 1 is that a current sensor (error) deciding unit 52 is provided. It determines whether the current sensors are normal or abnormal from a reference current value obtained from the current detection values (Ida and Idb) of the current sensors 12 and 12B and the rotor phase θ.

If the current sensor (error) deciding unit determines that there is an error, an error flag is output to the status display unit 43 and current sensor error information is output to the motor current estimating unit 51. The motor current estimating unit 51 uses the detection value of the current sensor that is determined to be normal without using the detection value of the current sensor determined to be abnormal to output a motor current estimated value Im.

If two pieces of current sensor information are determined to be normal, an average obtained from the two current sensors is used as the motor current estimated value Im.

The motor driving apparatus according to this embodiment has an error deciding function, which is indispensable when the apparatus is mounted on a vehicle. Even if an error occurs, the motor driving apparatus can run urgently without stopping due to the error as much as possible.

Figure 7:
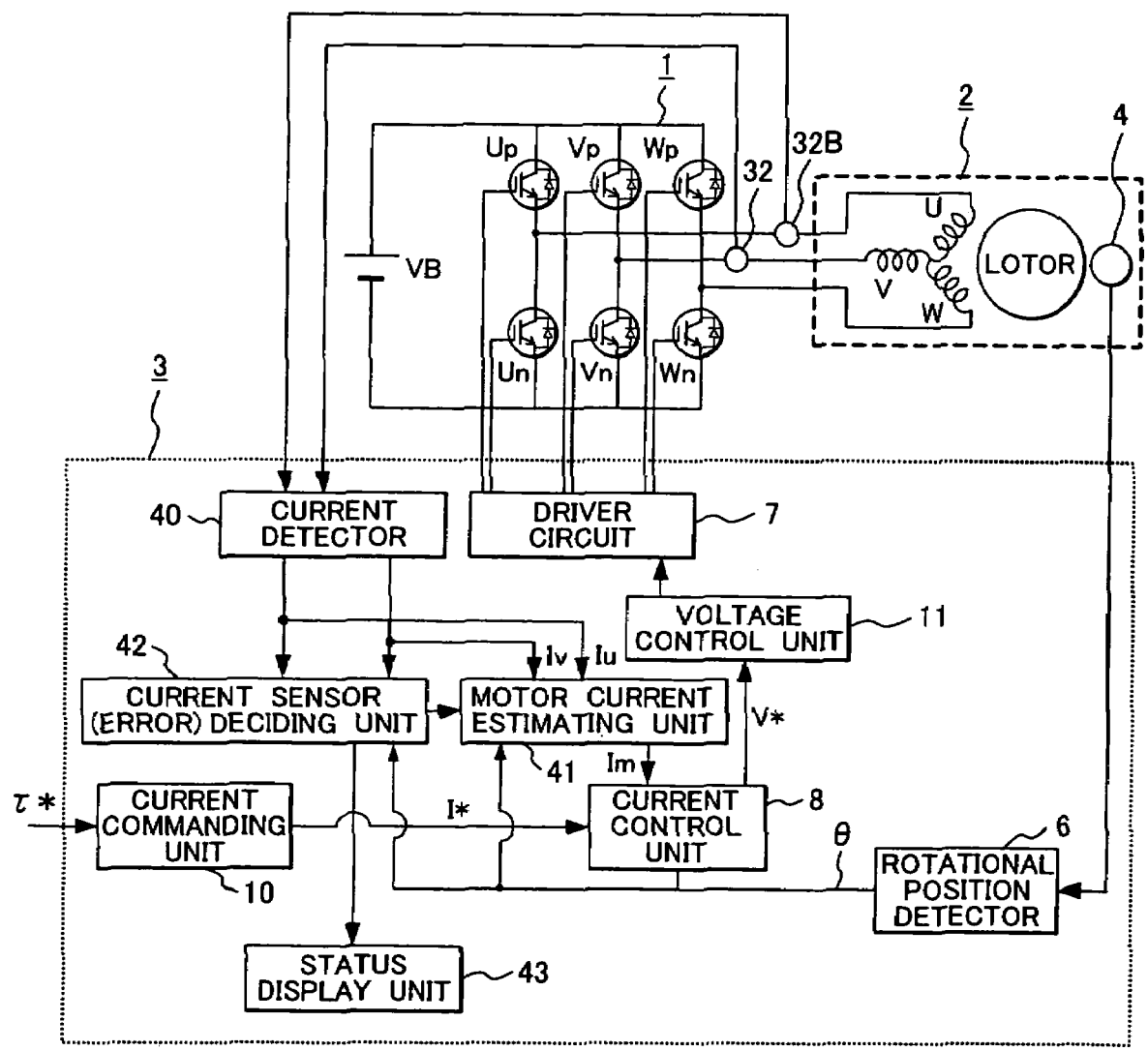
FIG. 7 is a block diagram of an AC motor driving apparatus in which a plurality of current sensors are provided on AC lines according to another embodiment of the present invention.

FIG. 7 is a control block diagram of an AC motor driving apparatus according to another embodiment of the present invention that has a plurality of current sensors on AC lines. FIG. 7 is similar to FIG. 5 in that a current sensor 32 is provided on an AC line (motor wiring) of the motor of the inverter, but differs from FIGS. 5 and 6 in that at least one current sensor 32B is added to either of the remaining two phases and the current detector 40, motor current estimating unit 41, and current sensor (error) deciding unit 42 are included. The other parts operate in the same way as those having the same reference numerals.

At least two current sensors 32 and 32B provided on AC lines (motor wiring) of the inverter assure redundancy of current sensors and enable a ground fault of the motor wiring (motor windings) to be detected under a particular condition. Another difference from FIG. 5 is that a current sensor (error) deciding unit 42 is provided. It determines whether the current sensors are normal or abnormal from a reference current value that is obtained from the current detection values (Iu and Iv) of the current sensors 32 and 32B and the rotor phase θ.

If the current sensor (error) deciding unit determines that there is an error, an error flag is output to the status display unit 43 and current sensor error information is output to the motor current estimating unit 41. The motor current estimating unit 41 uses the detection value of the current sensor that is determined to be normal without using the detection value of the current sensor determined to be abnormal to output a motor current estimated value Im.

If two pieces of current sensor information are determined to be normal, the motor current estimated value Im is obtained from the following relationship.

$$Iu+Iv+Iw=0$$

The motor driving apparatus according to this embodiment has an error deciding function, which is indispensable when the apparatus is mounted on a vehicle. Even if an error occurs, the motor driving apparatus can run urgently without stopping due to the error as much as possible.

Although two current sensors are provided on DC lines in the example in FIG. 6 and two current sensors are provided on AC lines (motor wiring) in the example in FIG. 7, at least two sensors may be distributed to a DC line and AC line (this arrangement is not shown). In this arrangement as well, the current detection value from one normal current sensor can be used to drive the motor continuously and other effects such as easy detection of an arm short circuit of the inverter can be obtained.

Figure 8:
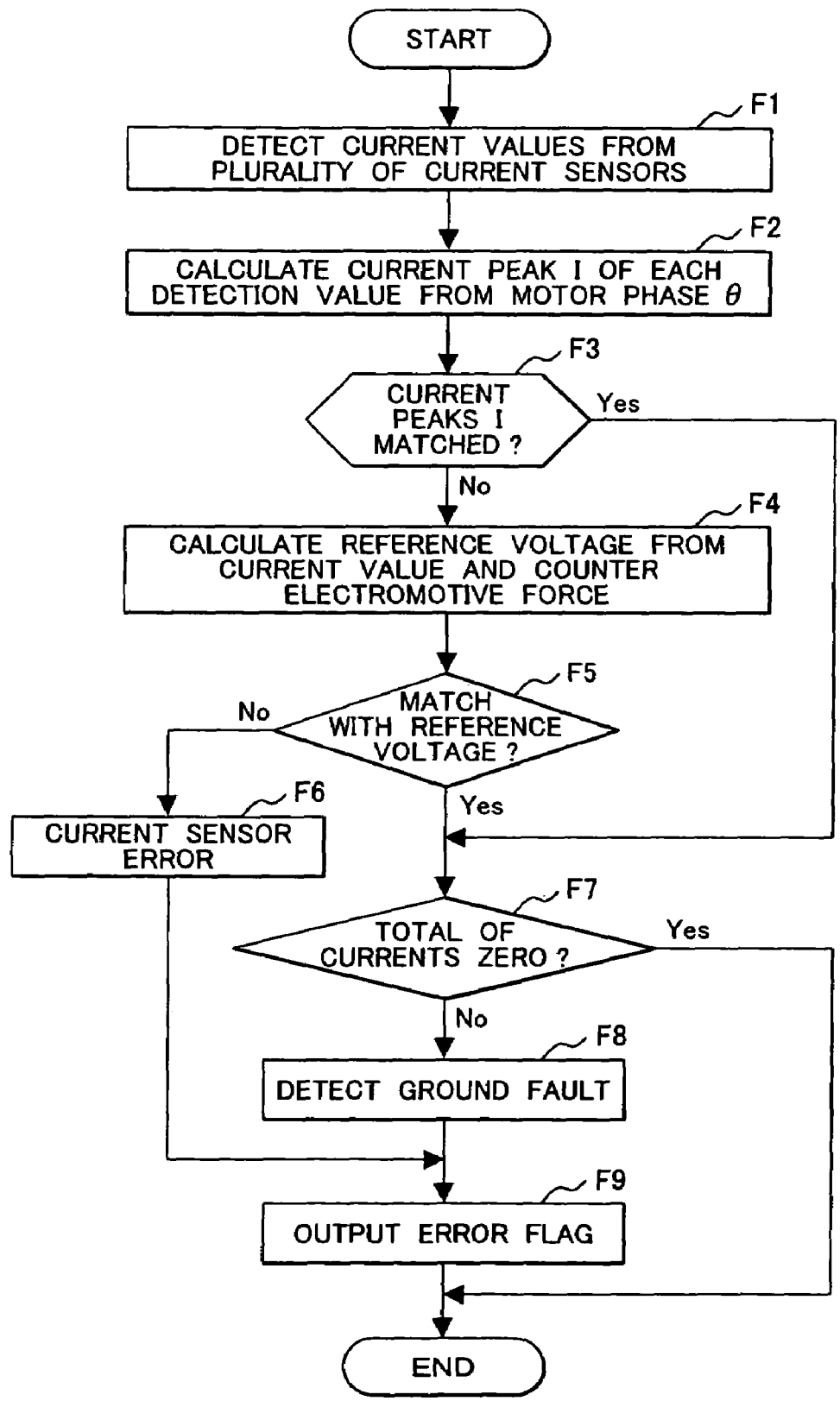
FIG. 8 shows a processing flow for determining a current sensor error according to another embodiment of the present invention.

FIG. 8 shows a processing flow for determining a current sensor error according to another embodiment of the present invention. A detection value of each current sensor is detected in step F1. The motor phase θ is used to calculate a current peak value I corresponding to each current detection value in step F2. In step F3, if the calculated current peak values I are the same as each other within a prescribed error range, they are determined to be normal; if the calculated current peak values I are different from each other, it is decided that there is an error. If the presence of an error is decided, the current detection value of each sensor and the motor phase θ are used to calculate a voltage in step F4. There is no problem if a voltage to be applied is calculated. The calculated voltage is compared with the reference voltage used as the reference value in step F5. If the difference therebetween is within a prescribed allowable error range, the current sensor is determined to be normal. If not, the presence of a current sensor error is determined, and a flag that identifies the current sensor determined to be abnormal and an error flag are set in step F6. In step F7, a compensation value is considered and added to the detected current value. If the result is within an allowable range, the current sensor is determined to be normal. If the result exceeds the allowable range and is not zero, the presence of a ground fault is determined and an error flag is set in step F8. If the presence of an error is determined, an error flag is set in step F9.

As described above, the motor driving apparatus according to this embodiment has an error deciding function, which is indispensable when the apparatus is mounted on a vehicle. Even if an error occurs, the motor driving apparatus can run urgently without stopping due to the error as much as possible.

Figure 9:
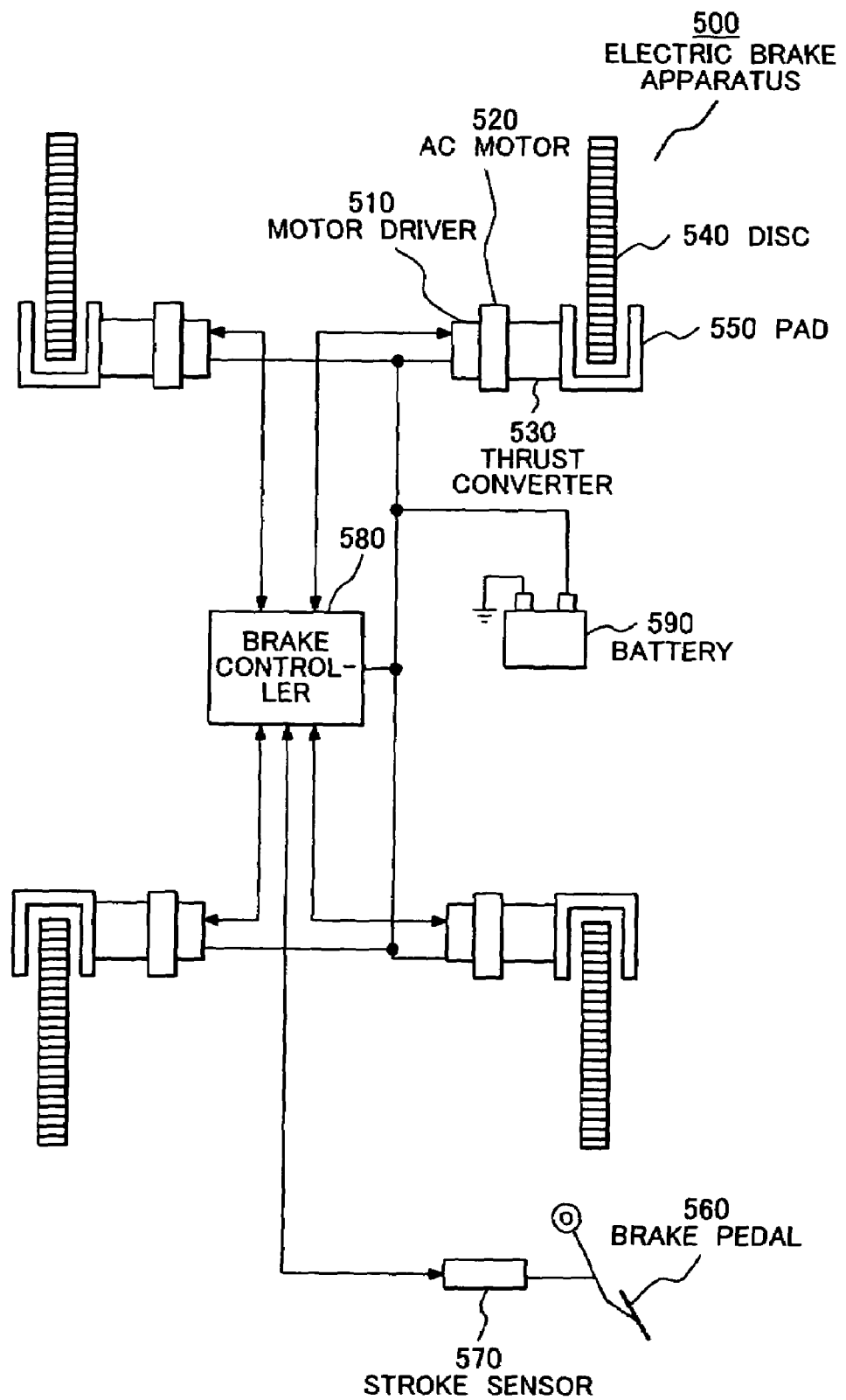
FIG. 9 shows an electric brake apparatus having an AC motor driving apparatus according to another exemplary application.

Next, an electric brake apparatus having an AC motor driving apparatus according to another exemplary application will be described with reference to FIG. 9.

The electric brake apparatus 500 uses a thrust converter 530 to convert the rotational force of an AC motor 520 driven by a motor driver 510 into a piston pressing force. The electric brake apparatus 500 then pushes a brake pad 550 against a brake disc 540. The AC motor 520 is integrally equipped with the motor driver 510. An amount by which a brake pedal 560 is depressed is measured by a stroke sensor 570 and transferred to a brake controller 580. The brake controller 580 controls the motor driver 510 according to the amount of depression of the brake pedal 560, drives the AC motor 520, and adjusts a brake force generated by the electric (disc) brake apparatus 500. A battery 590 supplies power to each motor driver 510 and the brake controller 580.

Operation of an electric brake system will be described below. When the operator depresses the brake pedal 560, the stroke sensor 570 reads a brake force requested by the operator and transmits the operator requesting force to the brake controller 580. The brake controller 580 then calculates a brake command value for each brake apparatus and transmits it to the motor driver 510 of the each brake apparatus. The motor driver 510 supplies an appropriate driving voltage to the motor 520 according to the brake command value. The driving voltage is, for example, a three-phase AC voltage for which pulse width modulation has been performed. When the driving voltage is applied to the AC motor 520, the motor 520 runs. The rotational force of the motor is converted by the thrust converter 530 into a force for pressing the disc brake (this operation is not shown). The brake pad 550 is then pressed against the brake disc 540. A gear mechanism, hydraulic mechanism, or the like can be used as the thrust converter 530.

According to the above embodiments, a space-saving, inexpensive electric actuator can be provided by using a small number of current sensors. If the one-pulse mode is used, highly responsive motor driving is possible. Even when abrupt acceleration and deceleration are required, therefore, an electric actuator that is further inexpensive and uses farther less space can be provided.

What is claimed is:

1. An AC motor driving apparatus, which has an AC motor, an inverter for supplying power to the motor, a current sensor for detecting current that flows in the motor or the inverter, a rotation sensor for detecting the rotation of the rotor in the motor, and a control unit for controlling the driving of the inverter, the apparatus comprising:
a rotational position detector for detecting a rotational position of the rotor from an output signal sent from the rotation sensor;
a motor current estimating unit for estimating values of three-phase currents that flow in the motor from a current detection value detected by the current sensor and the rotational position of the rotor; and
an inverter controller for controlling the inverter by using the estimated three-phase motor current values.

2. The AC motor driving apparatus according to claim 1, wherein the current sensor is a DC current detector for detecting DC current that flows in a DC line in the inverter.

3. The AC motor driving apparatus according to claim 1, wherein the current sensor is a phase current detector for detecting phase current that flows in a particular phase of the motor.

4. The AC motor driving apparatus according to claim 1, wherein the control unit has a one-pulse mode, in which a rectangular voltage for one pulse is supplied in half a cycle from the inverter to the motor.

5. The AC motor driving apparatus according to claim 1, wherein the control unit has a PWM controller for performing PWM control for the inverter and a current detector for performing current detection once in one PWM carrier cycle.

6. The AC motor driving apparatus according to claim 1, further comprising:
at least one second current sensor for detecting current that flows in a DC line of the inverter or a particular phase of the motor, besides the current sensor;
a current sensor error detector for detecting an error of the current sensor; and
a second motor current estimating unit for estimating the values of three-phase motor currents that flow in the motor from the current detection value of the second current sensor and the rotational position of the rotor when the error is detected.

7. The AC motor driving apparatus according to claim 6, further comprising an error status display unit for indicating an error of the current sensor when the error is detected.

8. The AC motor driving apparatus according to claim 1, further comprising:
at least two current sensors for detecting current that flows in the motor or the inverter;
a current sensor error deciding unit for determining whether the current sensors are normal or abnormal, by using current detection values from the plurality of current sensors;
a first motor current estimating unit that, when the plurality of current sensors are determined to be normal, estimates three-phase motor current values by using current detection values from the plurality of normal current sensors and the rotational position of the rotor; and
a second motor current estimating unit that, when any one of the plurality of current sensors is determined to be abnormal, estimates three-phase motor current values by using current detection value from the current sensor determined to be normal and the rotational position of the rotor.

9. The AC motor driving apparatus according to claim 8, further comprising an error status display unit for indicating an error of the one of the plurality of current sensors which is determined to be abnormal.

10. A vehicle, comprising the AC motor and the AC motor driving apparatus according to claim 1 wherein the AC motor driving apparatus receives a torque command from a vehicle controller as an input command given to the control unit and controls the AC motor for running thereof from zero speed to high speed.

11. A vehicle comprising:
an electric brake for converting the rotational force of the AC motor into a piston pressing force and pushing a brake pad against a brake disc; and
the AC motor driving apparatus according to claim 1 for supplying an appropriate driving voltage to the AC motor according to a brake command value.

12. A method of controlling an AC motor driving apparatus, which has an AC motor, an inverter for supplying power to the motor, a current sensor for detecting current that flows in the motor or the inverter, a rotation sensor for detecting the rotation of the rotor in the motor, and a control unit for controlling the driving of the inverter, the method comprising the steps of:
detecting a rotational position of the rotor from an output signal sent from the rotation sensor;
estimating the values of three-phase currents that flow in the motor from a current detection value detected by the current sensor and the rotational position of the rotor; and
controlling the inverter by using the estimated three-phase motor current values.

13. The method according to claim 12, wherein the current sensor detects DC current that flows in a DC line in the inverter.

14. The method according to claim 12, wherein the current sensor detects phase current that flows in a particular phase of the motor.

15. The method according to claim 12, wherein the control unit comprises the steps of:
performing PWM control for the inverter; and
supplying a rectangular voltage for one pulse in half a cycle from the inverter to the motor.

16. The method according to claim 12, wherein the control unit comprises the steps of:
performing PWM control for the inverter; and
performing current detection once in one PWM carrier cycle.

17. The method according to claim 12, wherein at least one second current sensor is provided on a DC line of the inverter or a particular phase of the motor besides the current sensor; the method further comprising the steps of:
detecting an error of the current sensor; and
estimating the values of three-phase motor currents that flow in the motor from the current detection value of the second current sensor and the rotational position of the rotor when the error is detected.

18. The method according to claim 17, further comprising the step of indicating the error of the current sensor when the error is detected.

19. The method according to claim 12, wherein at least two current sensors for detecting current that flows in the motor or the inverter are provided, the method further comprising the steps of:
- determining whether the plurality of current sensors are normal or abnormal, by using current detection values from the plurality of current sensors;
- estimating three-phase motor current values by using current detection values from the plurality of normal current sensors and the rotational position of the rotor, when the plurality of current sensors are determined to be normal; and
- estimating three-phase motor current values by using current detection values from current sensors determined to be normal and the rotational position of the rotor, when any one of the plurality of current sensors is determined to be abnormal.

20. A vehicle, which has a vehicle driving AC motor, an inverter for supplying power to the motor, a current sensor for detecting current that flows in the motor or the inverter, a rotation sensor for detecting the rotation of the rotor in the motor, and a control unit for controlling the driving of the inverter, the vehicle comprising:
- a rotational position detector for detecting a rotational position of the rotor from an output signal sent from the rotation sensor;
- a motor current estimating unit for estimating the values of three-phase currents that flow in the motor from a current detection value detected by the current sensor and the rotational position of the rotor; and
- an inverter controller for controlling the inverter by using the estimated three-phase motor current values.

* * * * *